United States Patent [19]

Sommer et al.

[11] 4,000,123
[45] Dec. 28, 1976

[54] AMINOSULFONYLPHENYL-AZO-INDOLYL DYESTUFFS

[75] Inventors: Richard Sommer, Leverkusen; Gerhard Wolfrum, Bergisch-Neukirchen; Hans Günter Otten, Leverkusen, all of Germany

[73] Assignee: Bayer Aktiengesellschaft, Leverkusen, Germany

[22] Filed: Feb. 3, 1975

[21] Appl. No.: 546,416

Related U.S. Application Data

[63] Continuation-in-part of Ser. No. 324,606, Jan. 18, 1973, abandoned.

[52] U.S. Cl. .............. 260/165; 260/156; 260/326.12 R
[51] Int. Cl.² .......... C09B 29/36; D06P 3/24
[58] Field of Search ........... 260/165, 156

[56] References Cited

UNITED STATES PATENTS

| 978,439 | 12/1910 | Dresse et al. | 260/165 |
|---|---|---|---|
| 1,113,622 | 10/1914 | Hauptmann et al. | 260/165 |
| 1,835,393 | 12/1931 | Hentrich et al. | 260/165 |
| 3,883,502 | 5/1975 | Sommer et al. | 260/165 |

FOREIGN PATENTS OR APPLICATIONS

| 321,521 | 1/1903 | France | 260/165 |
|---|---|---|---|
| 1,812,812 | 7/1970 | Germany | 260/165 |
| 15,847 | 1909 | United Kingdom | 260/165 |
| 12,465 | 1910 | United Kingdom | 260/165 |
| 969,445 | 9/1964 | United Kingdom | 260/165 |

OTHER PUBLICATIONS

United States Published Patent Application, B327,109, 1-28-1975, Wolfrum et al. 260-265.

Primary Examiner—Floyd D. Higel
Attorney, Agent, or Firm—Plumley and Tyner

[57] ABSTRACT

Monoazo dyestuffs which in the form of the free acid correspond to the general formula

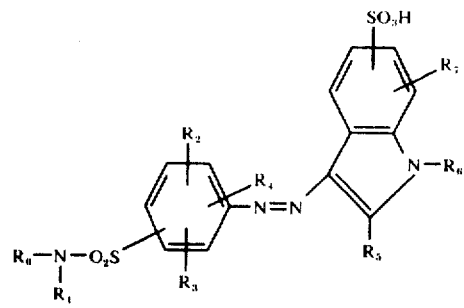

wherein $R_0$, $R_1$, $R_2$, $R_3$, $R_4$, $R_5$, $R_6$ and $R_7$ have the meaning given in the description and their use for the dyeing of natural and synthetic fibre materials, especially for dyeing polyamide fibres. Dyeings obtained distinguish themselves by very good fastness to light. Dyestuffs are absorbed well on polyamide fibres already in a neutral to weakly acid dye bath. By polyamide fibres there are here especially understood those from synthetic polyamides such as ε -polycaprolactam, or condensation products of adipic acid and hexamethylenediamine.

3 Claims, No Drawings

AMINOSULFONYLPHENYL-AZO-INDOLYL DYESTUFFS

This is a continuation-in-part of pending application Ser. No. 324,606 filed Jan. 18, 1973, now abandoned.

The subject of the present invention are monoazo dyestuffs which in the form of the free acid correspond to the formula

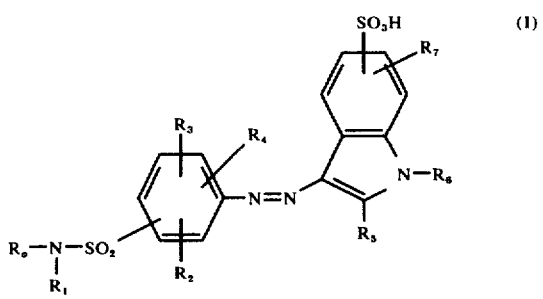

in which
$R_o$ denotes hydrogen, alkyl, aryl, aralkyl or a heterocyclic radical,
$R_1$ denotes hydrogen, alkyl, aralkyl or, together with $R_o$ and the N atom, a 5-membered or 6-membered ring,
$R_2$ denotes halogen, alkyl, aralkyl, alkoxy, nitro, nitrile, carbonamide or carboxylic acid ester,
$R_3$ denotes halogen, alkyl or alkoxy,
$R_4$ denotes hydrogen or halogen,
$R_5$ denotes alkyl or aryl,
$R_6$ denotes hydrogen or alkyl and
$R_7$ denotes hydrogen, halogen, alkyl or alkoxy.

The alkyl groups preferably contain 1–8 C atoms and can possess further non-ionic substituents, for example hydroxyl groups, chlorine, bromine, nitrile, alkoxy or alkoxycarbonyl, especially $C_1$–$C_4$-alkoxy or alkoxycarbonyl.

Suitable alkyl groups $R_2$, $R_3$, $R_5$ and $R_7$ are especially unsubstituted $C_1$–$C_4$-alkyl radicals, such as $CH_3$, $C_2H_5$, i-$C_3H_7$, n-$C_4H_9$ and i-$C_4H_9$.

Suitable alkyl groups $R_o$ and $R_1$ are in particular $C_1$–$C_6$-alkyl radicals, for example, $CH_3$, $C_2H_5$, n- and iso-$C_3H_7$, and n-, sec.- and iso-$C_4H_9$, which can be further substituted by nonionic substituents, for example by hydroxyl groups, chlorine, bromine, organo, alkoxy, especially $C_1$–$C_4$-alkoxy, and alkoxycarbonyl, especially $C_1$–$C_4$-alkoxycarbonyl. Further alkyl groups $R_o$ and $R_1$ are cycloalkyl groups, for example cyclohexyl.

Suitable alkyl radicals $R_6$ are in particular those with 1-4 C atoms which can be further substituted, for example by -CN, -$CONH_2$ or -COOH, such as, for example, -$CH_3$, -$C_2H_5$, -$C_3H_7$, -$C_4H_9$, -$C_2H_4CN$, -$C_2H_4CONH_2$ and -$C_2H_4COOH$.

Suitable alkoxy radicals $R_2$, $R_3$ and $R_7$ are in particular those with 1-4 C atoms, for example -$OCH_3$, -$OC_2H_5$, -$OC_3H_7$ and $OC_4H_9$.

Suitable aryl radicals $R_5$ are in particular phenyl or naphthyl radicals which are optionally substituted further, for example by alkyl, especially $C_1$–$C_4$-alkyl, alkoxy, especially $C_1$–$C_4$-alkoxy, or halogen, especially chlorine or bromine, such as phenyl, biphenylyl or naphthyl.

Suitable aryl radicals $R_o$ are in particular phenyl or naphthyl radicals which are optionally substituted further, e.g. tolyl.

Suitable aralkyl radicals $R_o$ and $R_1$ are in particular benzyl or phenylethyl groups which are optionally substituted further by non-ionic substituents.

An example of a suitable heterocyclic radical $R_o$ is the 3-sulpholanyl radical.

Examples of suitable rings $R_o + R_1$ including the N-atom are:

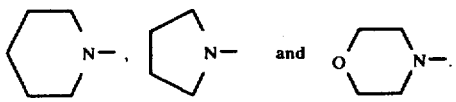

Suitable halogen atoms $R_2$, $R_3$, $R_4$ and $R_7$ are fluorine, chlorine and bromine.

Within the framework of the formula (1), preferred dyestuffs are those which in the form of the free acid correspond to the formula

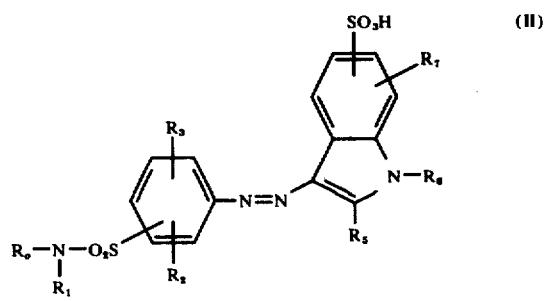

wherein
$R_o$, $R_1$, $R_2$, $R_3$, $R_5$, $R_6$ and $R_7$ have the abovementioned meaning.

Particularly preferred dyestuffs are those which in the form of the free acid correspond to the formula

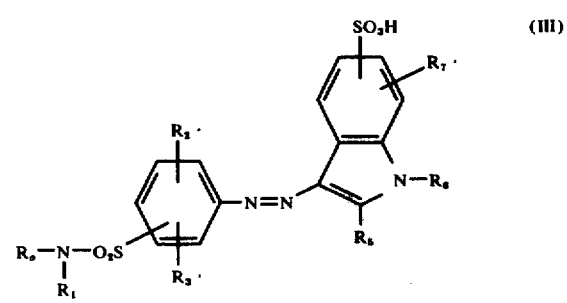

wherein
$R_o$, $R_1$, $R_5$ and $R_6$ have the abovementioned meaning,
$R_2'$ and $R_3'$ represent chlorine or bromine and
$R_7'$ represents hydrogen, chlorine or $C_1$–$C_4$-alkyl which is not substituted further,
especially those which in the form of the free acid correspond to the formula

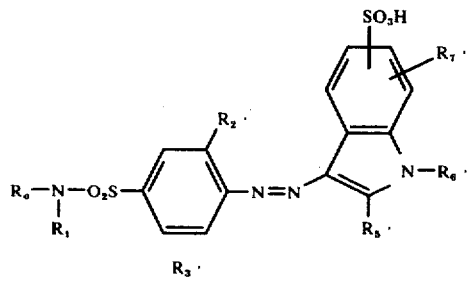

wherein

R$_o$, R$_1$, R$_2'$, R$_3'$ and R$_7'$ have the abovementioned meaning,

R$_5'$ denotes C$_1$–C$_4$-alkyl which is not substituted further, or phenyl and R$_6'$ denotes hydrogen or C$_1$–C$_4$-alkyl which is optionally substituted by cyano, carbonamide or carboxyl.

Included within the scope of this invention is the class of dyestuffs having the formula (I) in which R$_o$ denotes hydrogen; C$_1$–C$_6$-alkyl; C$_1$–C$_6$-alkyl substituted by hydroxy, chlorine, bromine, cyano, C$_1$–C$_4$-alkoxy or C$_1$–C$_4$-alkoxycarbonyl; cyclohexyl; phenyl; naphthyl; tolyl; benzyl; phenethyl; 3-sulfolanyl;

R$_1$ denotes hydrogen; C$_1$–C$_6$-alkyl; C$_1$–C$_6$-alkyl substituted by hydroxy, chlorine, bromine, cyano, C$_1$–C$_4$-alkoxy or C$_1$–C$_4$-alkoxycarbonyl; cyclohexyl or together with R$_o$ a piperidino, pyrrolidino or morpholino ring;

R$_2$ and R$_3$ denote chlorine or bromine

R$_4$ denotes hydrogen and

R$_5$ denotes C$_1$–C$_4$-alkyl, phenyl, naphthyl or biphenylyl,

R$_6$ denotes hydrogen; C$_1$–C$_4$-alkyl, C$_1$–C$_4$-alkyl substituted by cyano, carbonamide or carboxy R$_7$ denotes hydrogen, chlorine or C$_1$–C$_4$-alkyl.

The new dyestuffs of the formula (I) are obtained if amines of the general formula

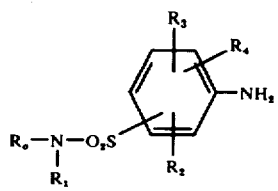

wherein

R$_o$, R$_1$, R$_2$, R$_3$ and R$_4$ have the abovementioned meaning are diazotised and combined with coupling components of the general formula

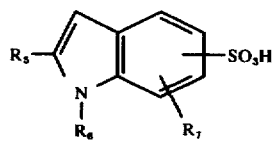

wherein

R$_5$R$_6$ and R$_7$ have the abovementioned meaning.

The diazo components of the general formula (V) are either known from the literature or are obtained in accordance with instructions known from the literature, for example by amidising acetylaminobenzenesulphochlorides or nitrobenzenesulphochlorides with amines of the formula

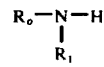

wherein

R$_o$ and R$_1$ have the abovementioned meaning and splitting of the acetyl group or converting the nitro group into the amino group by reduction.

Examples of suitable amines of the formula (V) are: aniline-4,5-dichloro-2-N,N-dimethyl-sulphonamide, aniline-4,5-dichloro-2-N,N-diethyl-sulphonamide, aniline-4,5-dichloro-2-N-ethyl-sulphonamide, aniline-2,5-dichloro-4-sulphonamide, aniline-2,5-dichloro-4-N-methyl-sulphonamide, aniline-2,5-dichloro-4-N-ethyl-sulphonamide, aniline-2,5-dichloro-4-N-propyl-sulphonamide, aniline-2,5-dichloro-4-N-butyl-sulphonamide, aniline-2,5-dichloro-4-N-benzyl-sulphonamide, aniline-2,5-dichloro-4-N-phenyl-sulphonamide, aniline-2,5-dichloro-4-N-(m-tolyl)-sulphonamide, aniline-2,5-dichloro-4-N-γ-chloropropyl-sulphonamide, aniline-2,5-dichloro-4-β-hydroxyethyl-sulphonamide, aniline-2,5-dichloro-4-N-γ-hydroxypropyl-sulphonamide, aniline-2,5-dichloro-4-N-γ-hydroxybutyl-sulphonamide, aniline-2,5-dichloro-4-N-cyclohexyl-sulphonamide, aniline-2,5-dichloro-4-N,N-dimethyl-sulphonamide, aniline-2,5-dichloro-4-N,N-diethyl-sulphonamide, aniline-2,5-dichloro-4-N,N-bis-(β-hydroxyethyl)-sulphonamide, aniline-2,5-dichloro-4-N,N-tetramethylene-sulphonamide, aniline-2,5-dichloro-4-N,N-pentamethylene-sulphonamide, aniline-2,6-dichloro-4-sulphonamide, aniline-2,6-dichloro-4-N-methyl-sulphonamide, aniline-2,6-dichloro-4-N-ethyl-sulphonamide, aniline-2,6-dichloro-4-N-β-hydroxyethyl-sulphonamide, aniline-2,6-dichloro-4-N-benzyl-sulphonamide, aniline-2,6-dichloro-4-N-phenyl-sulphonamide, aniline-2,6-dichloro-4-N-γ-hydroxybutyl-sulphonamide, aniline-2,6-dichloro-4-N,N-diethyl-sulphonamide, aniline-2,6-dichloro-4-N-methyl-N-phenyl-sulphonamide, aniline-2,6-dichloro-4-N-methyl-N-β-hydroxyethyl-sulphonamide, aniline-2,6-dichloro-4-N,N-pentamethylenesulphonamide, aniline-2,6-dichloro-4-N,N-bis-(β-hydroxyethyl)-sulphonamide, aniline-2-chloro-5-bromo-4-N,N-dimethyl-sulphonamide, aniline-2-chloro-5-bromo-4-N-ethyl-sulphonamide, aniline-2-chloro-5-bromo-4-N-benzyl-sulphonamide, aniline-2-chloro-5-bromo-4-N,N-bis-(β-hydroxyethyl)-sulphonamide, aniline-2-chloro-5-bromo-4-N-cyclohexyl-sulphonamide, aniline-2-chloro-5-bromo-4-N,N-dipropylsulphonamide, aniline-2-bromo-5-chloro-4-N,N-dimethyl-sulphonamide, aniline-2-bromo-5-chloro-4-N-γ-hydroxypropyl-sulphonamide, aniline-2-bromo-5-chloro-4-N-ethyl-sulphonamide, aniline-2-chloro-6-bromo-4-N-methyl-sulphonamide, aniline-2-chloro-6-bromo-4-N,N-diethyl-sulphonamide, aniline-2-chloro-6-bromo-4-N-phenyl-sulphonamide, aniline-2,5-dibromo-4-N-benzyl-sulphonamide, aniline-2,5-dibromo-4-N,N-diethyl-sulphonamide, aniline-2,5-dibromo-4-N,N-pentamethylene-sulphonamide, aniline-2,5-dibromo-4-N-methyl-N-β-hydroxy-ethyl-sulphonamide, aniline-2,6-dibromo-4-N,N-dimethyl-sulphonamide, aniline-2,6-dibromo-4-N-β-hydroxyethyl-sulphonamide, aniline-2,6-dibromo-4-N-propyl-sulphonamide, aniline-2,6-dibromo-4-N-butyl-sulphonamide, aniline-2-chloro-6-methyl-4-N-methyl-sulphonamide, aniline-2-chloro-6-methyl-4-sulphonamide, aniline-2-chloro-6-methyl-4-N,N-diethyl-sulphonamide, aniline-4-chloro-6-methyl-2-N,N-diethyl-sulphonamide, aniline-4-chloro-6-methyl-2-N-β-hydroxyethyl-sulphonamide, aniline-4-chloro-6-methyl-2-N,N-dimethyl-sulphonamide, aniline-4-chloro-5-methyl-2-N,N-diethyl-sulphonamide, aniline-4-chloro-5-methyl-2-N,N-dimethyl-sulphonamide, aniline-2,6-dimethyl-3-sulphonamide, aniline-2,6-dimethyl-3-N-methyl-sulphonamide, aniline-2,6-dimethyl-3-N,N-diethyl-sulphonamide, aniline-2,5,6-trichloro-3-sulphonamide, aniline-2,5,6-trichloro-3-N-methyl-sulphonamide, aniline-2,5,6-trichloro-3-N-methyl-N-β-hydroxy-ethyl-sulphonamide, aniline-2,5,6-trichloro-N,N-diethyl-sulphonamide, aniline-4,6-dichloro-2-N,N-dimethyl-sulphonamide, aniline-4,6-dichloro-2-N-methyl-sulphonamide, aniline-4,6-dichloro-2-N,N-dimethylsulphonamide, aniline-2,4-dimethyl-5-N,N-dimethyl-sulphonamide, aniline-2,4-dimethyl-5-N-ethyl-sulphonamide, aniline-2,4-dimethyl-5-N-γ-hydroxybutyl-sulphonamide, aniline-4,5-dichloro-4-N-methyl-sulphonamide, aniline-4,5-dichloro-4-γ-hydroxybutylsulphonamide, aniline-4,5-dichloro-4-N-benzyl-sulphonamide, aniline-2,5-dichloro-N-methoxyethyl-sulphonamide, N-(2,5-dichloro-4-amino-phenyl-sulphonyl)-morpholine, N-(2,5-dichloro-4-amino-phenyl-sulphonyl)-piperidine, aniline-2,5-dichloro-4-N-sulpholanyl-(3)-sulphonamide, and aniline-2,5-dichloro-4-N-methyl-N-sulpholanyl-(3)-sulphonamide.

Examples of suitable coupling components of the formula (VI) are the indolesulphonic acids described in German Patent Specification No. 137,117 and other indolesulphonic acids which are obtained analogously to the processes described in German Patent Specification No. 137,117 by sulphonation of 2-alkylindoles or 2-arylindoles. This probably yields the indole-5-sulphonic acids, at least when using the indoles which are unsubstituted in the 5-position. As examples of suitable indolesulphonic acids there may be mentioned: 2-methyl-indole-sulphonic acid, 2-ethyl-indole-sulphonic acid, 2-phenyl-indole-sulphonic acid, 1-methyl-2-phenyl-indole-sulphonic acid, 1,2-dimethyl-indolesulphonic acid, 1-ethyl-2-methyl-indole-sulphonic acid, 1,2,5-trimethyl-indole-sulphonic acid and 2,5-dimethyl-indole-sulphonic acid.

The dyestuffs according to the invention are suitable for dyeing natural and synthetic fibre materials, especially for dyeing polyamide fibres. They yield level yellow to orange dyeings of good yield and very good wet fastness like fastness to washing, perspiration and hot water and fastness to light. They are absorbed well on polyamide fibres already in a neutral to weakly acid dye bath. By polyamide fibres there are here especially understood those from synthetic polyamides such as ε-polycaprolactam, or condensation products of adipic acid and hexamethylendiamine. The dyestuffs are employed in the form of the free acid or in the form of their salts, especially of the alkali metal salts such as the sodium salts or potassium salts or of the ammonium salts. The formulae given above are those of the free acid.

EXAMPLE 1

5.25 g of 2,5-dichloro-aniline-sulphonamide are introduced, at 3°-5°, into a mixture of 20 ml of glacial acetic acid, 20 ml of concentrated sulphuric acid and 7.5 g of nitrosylsulphuric acid and the mixture is stirred for a further 1.5 hours at 3°-5° C. It is then poured out onto ice/$H_2O$, a little amidosulphonic acid is added and the resulting solution is combined with a solution of 4.74 g of 2-methyl-indole-sulphonic acid in water. The mixture is neutralised somewhat with sodium acetate and after completion of coupling the dyestuff, which in the form of the free acid corresponds to the formula

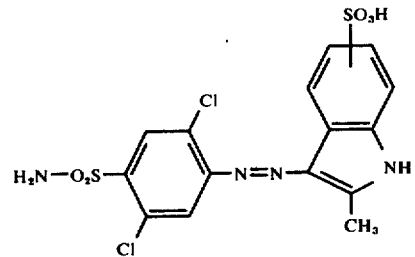

is isolated by salting out and filtering off. It dyes polyamide, from a weakly acid neutral bath, in yellow shades of very good fastness to light.

EXAMPLE 2

If the procedure described in Example 1 is followed but 5.85 g of 2,5-dichloro-aniline-4-N,N-dimethylsulphonamide are employed as the diazo component, a dyestuff is obtained which in the form of the free acid corresponds to the formula

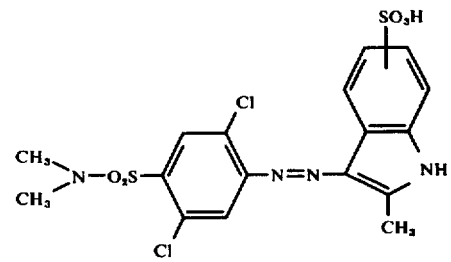

and dyes polyamide from a weakly acid or neutral bath in yellow shades of very good fastness to light.

EXAMPLE 3

6.5 g of 2,5-dichloro-aniline-4-N-methyl-N-γ-hydroxyethyl-sulphonamide are diazotised, in dilute hydrochloric acid, with 16 g of a 10% strength sodium nitrate solution of 0°. After the excess nitrite has been removed with amidosulphonic acid, a solution of 4.74 g of 2-methyl-indole-sulphonic acid in water is added and the mixture is buffered somewhat with sodium acetate. The dyestuff thus obtained corresponds, in the form of the free acid, to the formula

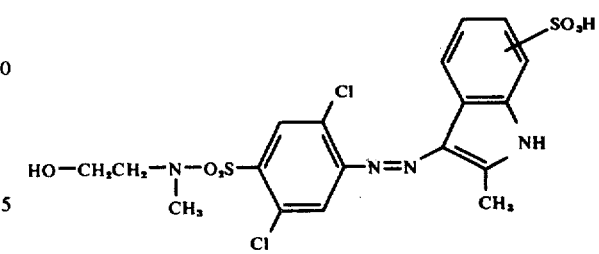

and dyes polyamide from a weakly acid or neutral bath in yellow shades of very good fastness to light.

DYEING EXAMPLES 0.1 g of the dyestuff from Example 1 is dissolved in 100 ml of hot water, 5 ml of 10% strength ammonium acetate solution are added and the mixture is diluted to a volume of 500 ml of water. 10 g of polyamide fibres are introduced into the dye bath, which is brought to the boil over the course of 20 minutes, 4 ml of 10% strength acetic acid are added and the whole is kept at the boil for one hour. Thereafter the fibres are rinsed and dried at 70°–80° C. A dyeing in a yellow shade of very good fastness to light and wet processing is obtained.

If the procedure in Example 1 or in Example 3 is followed but the compounds listed in Column II of the table which follows are employed as diazo components, valuable water-soluble dyestuffs are again obtained, which dye polyamide, from a weakly acid or neutral bath, in yellow to orange light-fast shades.

| Example | Diazo component | Coupling component |
|---|---|---|
| 4 | HO—CH$_2$CH$_2$—NH—SO$_2$—(2,5-Cl$_2$-C$_6$H$_2$)—NH$_2$ | 2-Phenyl-indole-sulphonic acid |
| 5 | " | 1-Methyl-2-phenyl-indole-sulphonic acid |
| 6 | " | 1,2-Dimethyl-indole-sulphonic acid |
| 7 | (CH$_3$)$_2$N—SO$_2$—(2,5-Cl$_2$-C$_6$H$_2$)—NH$_2$ | 2-Phenyl-indole-sulphonic acid |
| 8 | " | 1-Ethyl-2-methyl-indole-sulphonic acid |
| 9 | CH$_3$—NH—SO$_2$—(2,5-Cl$_2$-C$_6$H$_2$)—NH$_2$ | 2-Methyl-indole-sulphonic acid |
| 10 | " | 1-Methyl-2-phenyl-indole-sulphonic acid |
| 11 | " | 1,2,5-Trimethyl-indole-sulphonic acid |
| 12 | " | 2,5-Dimethyl-indole-sulphonic acid |
| 13 | C$_2$H$_5$—NH—SO$_2$—(2,5-Cl$_2$-C$_6$H$_2$)—NH$_2$ | 2-Phenyl-indole-sulphonic acid |
| 14 | " | 2-Methyl-indole-sulphonic acid |
| 15 | C$_3$H$_7$—NH—SO$_2$—(2,5-Cl$_2$-C$_6$H$_2$)—NH$_2$ | 1-Methyl-2-phenyl-indole-sulphonic acid |
| 16 | (C$_2$H$_5$)$_2$N—SO$_2$—(2,5-Cl$_2$-C$_6$H$_2$)—NH$_2$ | 2-Phenyl-indole-sulphonic acid |
| 17 | " | 2-Methyl-indole-sulphonic acid |
| 18 | " | 2-Ethyl-indole-sulphonic acid |
| 19 | HO—CH$_2$CH$_2$—N(CH$_3$)—SO$_2$—(2,5-Cl$_2$-C$_6$H$_2$)—NH$_2$ | 1-Methyl-2-phenyl-indole-sulphonic acid |
| 20 | | 2,5-Dimethyl-indole-sulphonic acid |
| 21 | (HO—CH$_2$CH$_2$)$_2$N—SO$_2$—(2,5-Cl$_2$-C$_6$H$_2$)—NH$_2$ | 2-Methyl-indole-sulphonic acid |
| 22 | (HO—CH$_2$CH$_2$CH$_2$)$_2$N—SO$_2$—(2,5-Cl$_2$-C$_6$H$_2$)—NH$_2$ | 1-Methyl-2-phenyl-indole-sulphonic acid |
| 23 | " | 1,2,5-Trimethyl-indole-sulphonic acid |

-continued

| Example | Diazo component | Coupling component |
|---|---|---|
| 24 | HO-CH(CH₃)-CH₂CH₂-NH-SO₂-[2,5-diCl-4-NH₂-phenyl] | 2-Methyl-indole-sulphonic acid |
| 25 | " | 2-Phenyl-indole-sulphonic acid |
| 26 | piperidino-SO₂-[2,5-diCl-4-NH₂-phenyl] | 2-Methyl-indole-sulphonic acid |
| 27 | " | 1-Methyl-2-phenyl-indole-sulphonic acid |
| 28 | C₄H₉-NH-SO₂-[2,5-diCl-4-NH₂-phenyl] | 2-Methyl-indole-sulphonic acid |
| 29 | " | 2,5-Dimethyl-indole-sulphonic acid |
| 30 | " | 2-Ethyl-indole-sulphonic acid |
| 31 | C₆H₅-NH-SO₂-[2,5-diCl-4-NH₂-phenyl] | 2-Phenyl-indole-sulphonic acid |
| 32 | 3-CH₃-C₆H₄-NH-SO₂-[2,5-diCl-4-NH₂-phenyl] | 2-Methyl-indole-sulphonic acid |
| 33 | Cl-CH₂CH₂CH₂-NH-SO₂-[2,5-diCl-4-NH₂-phenyl] | 2-Methyl-indole-sulphonic acid |
| 34 | " | 2-Phenyl-indole-sulphonic acid |
| 35 | C₆H₅-CH₂-NH-SO₂-[2,5-diCl-4-NH₂-phenyl] | 2-Ethyl-indole-sulphonic acid |
| 36 | " | 2-Methyl-indole-sulphonic acid |
| 37 | morpholino-SO₂-[2,5-diCl-4-NH₂-phenyl] | 2-Phenyl-indole-sulphonic acid |
| 38 | " | 1-Methyl-2-phenyl-indole-sulphonic acid |
| 39 | (CH₃)₂N-SO₂-[2-Cl-4-NH₂-5-Br-phenyl] | 2-Methyl-indole-sulphonic acid |
| 40 | (CH₃)₂N-SO₂-[2,5-diBr-4-NH₂-phenyl] | 1-Methyl-2-phenyl-indole-sulphonic acid |
| 41 | (CH₃)₂N-SO₂-[2,5-diCl-4-NH₂-phenyl] | 2-Methyl-indole-sulphonic acid |
| 42 | " | 1-Methyl-2-phenyl-indole-sulphonic acid |
| 43 | " | 2,5-Dimethyl-indole-sulphonic acid |
| 44 | HO-CH₂CH₂-N(CH₃)-SO₂-[2,5-diCl-4-NH₂-phenyl] | 2-Ethyl-indole-sulphonic acid |
| 45 | " | 1-Methyl-2-phenyl-indole-sulphonic acid |

-continued

| Example | Diazo component | Coupling component |
|---|---|---|
| 46 | (HO—CH₂CH₂)₂N—SO₂—[2,6-Cl₂-4-NH₂-phenyl] | 2-Methyl-indole-sulphonic acid |
| 47 | HO—CH(CH₃)—CH₂CH₂—NH—SO₂—[2,6-Cl₂-4-NH₂-phenyl] | 2-Phenyl-indole-sulphonic acid |
| 48 | HO—CH₂CH₂CH₂—NH—SO₂—[2,6-Cl₂-4-NH₂-phenyl] | 2-Methyl-indole-sulphonic acid |
| 49 | " | 1-Methyl-2-phenyl-indole-sulphonic acid |
| 50 | CH₃—NH—SO₂—[3-CH₃-5-Cl-4-NH₂-phenyl] | 2-Methyl-indole-sulphonic acid |
| 51 | " | 2-Phenyl-indole-sulphonic acid |
| 52 | HO—CH₂CH₂—N(CH₃)—SO₂—[2,5-Br₂-4-NH₂-phenyl] | 2-Methyl-indole-sulphonic acid |
| 53 | " | 1-Methyl-2-phenyl-indole-sulphonic acid |
| 54 | (CH₃)₂N—SO₂—[2,5-Br₂-4-NH₂-phenyl] | 2,5-Dimethyl-indole-sulphonic acid |
| 55 | " | 2-Ethyl-indole-sulphonic acid |
| 56 | C₂H₅—NH—SO₂—[2,5-Br₂-4-NH₂-phenyl] | 1,2,5-Trimethyl-indole-sulphonic acid |
| 57 | " | 1-Methyl-2-phenyl-indole-sulphonic acid |
| 58 | (C₂H₅)₂N—SO₂—[2,5-Br₂-4-NH₂-phenyl] | 2-Methyl-indole-sulphonic acid |
| 59 | (HO—CH₂CH₂)₂N—SO₂—[2-Cl-5-Br-4-NH₂-phenyl] | 2-Phenyl-indole-sulphonic acid |
| 60 | HO—CH₂CH₂CH₂—NH—SO₂—[2-Cl-5-Br-4-NH₂-phenyl] | 2-Methyl-indole-sulphonic acid |
| 61 | (C₂H₅)₂N—SO₂—[2-Br-5-Cl-4-NH₂-phenyl] | 1-Methyl-2-phenyl-indole-sulphonic acid |
| 62 | CH₃—NH—SO₂—[2-Br-5-Cl-4-NH₂-phenyl] | 1-Ethyl-2-methyl-indole-sulphonic acid |
| 63 | " | 2,5-Dimethyl-indole-sulphonic acid |

-continued

| Example | Diazo component | Coupling component |
|---|---|---|
| 64 | Cl—C6H2(CH3)(NH2)—SO2N(CH3)2 | 2-Methyl-indole-sulphonic acid |
| 65 | " | 1-Methyl-2-phenyl-indole-sulphonic acid |
| 66 | Cl—C6H2(CH3)(NH2)—SO2—N(C2H5)2 | 2-Methyl-indole-sulphonic acid |
| 67 | " | 1,2-Dimethyl-indole-sulphonic acid |
| 68 | H2N—SO2—C6H(CH3)2(NH2)(CH3) | 2-Methyl-indole-sulphonic acid |
| 69 | " | 1-Methyl-2-phenyl-indole-sulphonic acid |
| 70 | " | 2-Phenyl-indole-sulphonic acid |
| 71 | (CH3)2NSO2—C6(Cl)3(NH2)(Cl) | 2-Methyl-indole-sulphonic acid |
| 72 | " | 1,2-Dimethyl-indole-sulphonic acid |
| 73 | CH3—NHO2S—C6(Cl)3(NH2)(Cl) | 1-Methyl-2-phenyl-indole-sulphonic acid |
| 74 | " | 1-Ethyl-2-methyl-indole-sulphonic acid |
| 75 | Cl2—C6H2(NH2)—SO2—N(C2H5)2 | 2-Methyl-indole-sulphonic acid |
| 76 | " | 2,5-Dimethyl-indole-sulphonic acid |
| 77 | Cl2—C6H2(NH2)—SO2N(CH3)2 | 1-Methyl-2-phenyl-indole-sulphonic acid |
| 78 | " | 1,2,5-Trimethyl-indole-sulphonic acid |
| 79 | (CH3)2—C6H2(NH2)(CH3)—SO2—N(CH3)2 | 2-Methyl-indole-sulphonic acid |
| 80 | (CH3)2—C6H2(NH2)(CH3)—SO2—NH—CH3 | 1,2-Dimethyl-indole-sulphonic acid |
| 81 | " | 2-Phenyl-indole-sulphonic acid |
| 82 | (CH3)2—C6H2(NH2)(CH3)—SO2—N(C2H5)2 | 1-Methyl-2-phenyl-sulphonic acid |
| 83 | " | 2-Methyl-indole-sulphonic acid |
| 84 | CH3—NH—O2S—C6H2(Cl)2(NH2) | 2-Methyl-indole-sulphonic acid |
| 85 | " | 1,2-Dimethyl-indole-sulphonic acid |
| 86 | " | 2-Phenyl-indole-sulphonic acid |
| 87 | Cl2—C6H2(NH2)—SO2N(CH3)2 | 2-Methyl-indole-sulphonic acid |

-continued

| Example | Diazo component | Coupling component |
|---|---|---|
| 88 | " | 2-Phenyl-indole-sulphonic acid |
| 89 | | 2-Methyl-indole-sulphonic acid |
| 90 | " | 2-Phenyl-indole-sulphonic acid |
| 91 | " | 1-Methyl-2-phenyl-indole-sulphonic acid |
| 92 | | 1,2-Dimethyl-indole-sulphonic acid |
| 93 | " | 2-Methyl-indole-sulphonic acid |
| 94 | | 2-Phenyl-indole-sulphonic acid |
| 95 | | 1-Methyl-2-phenyl-indole-sulphonic acid |
| 96 | | 2-Phenyl-indole-sulphonic acid |
| 97 | " | 2-Methyl-indole-sulphonic acid |
| 98 | " | 1-Methyl-2-phenyl-indole-sulphonic acid |
| 99 | " | 2,5-Dimethyl-indole-sulphonic acid |
| 100 | | 2-Methyl-indole-sulphonic acid |
| 101 | " | 2-Phenyl-indole-sulphonic acid |
| 102 | " | 1-Methyl-2-phenyl-indole-sulphonic acid |

EXAMPLE 103

193 g of 2-phenyl-indole are introduced at 20°–25° C into 300 ml of sulphuric acid monohydrate and 650 g of 20% stength oleum are then allowed to run in over the course of 20 minutes, during which the temperature rises to 40° C. The mixture is stirred for a further hour at 40° C and is poured out onto 1600 g of ice, whereupon the 2-phenyl-indole-sulphonic acid precipitates. It is filtered off, washed with saturated sodium chloride solution until free of acid, and dried at 60° C.

We claim:

1. Monoazo dyestuff which in the form of the free acid corresponds to the formula

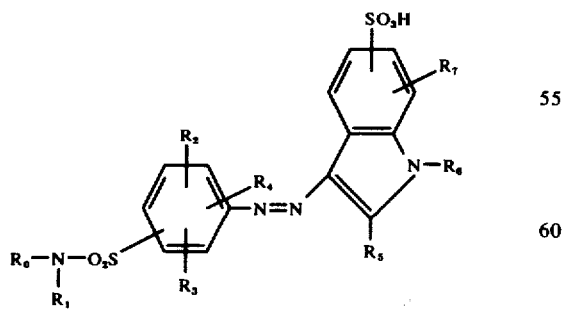

wherein $R_0$ denotes hydrogen; $C_1$–$C_6$-alkyl; $C_1$–$C_6$-alkyl substituted by hydroxy, chlorine, bromine, cyano, $C_1$–$C_4$-alkoxy or $C_1$–$C_4$-alkoxycarbonyl; cyclohexyl; phenyl; naphthyl; tolyl; benzyl; phenethyl; 3-sulfolanyl;

$R_1$ denotes hyrogen; $C_1$–$C_6$-alkyl; $C_1$–$C_6$-alkyl substituted by hydroxy, chlorine, bromine, cyano, $C_1$–$C_4$-alkoxy or $C_1$–$C_4$-alkoxycarbonyl; cyclohexyl or together with $R_0$ a piperidino, pyrrolidino or morpholino ring;

$R_2$ and $R_3$ denote chlorine or bromine $R_4$ denotes hydrogen;

$R_5$ denotes $C_1$–$C_4$-alkyl, phenyl, naphthyl or biphenylyl;

$R_6$ denotes hydrogen; $C_1$–$C_4$-alkyl, $C_1$–$C_4$-alkyl substituted by cyano, carbonamide or carboxy; and $R_7$ denotes hydrogen, chlorine or $C_1$–$C_4$-alkyl.

2. Monoazo dyestuff of claim 1 of the formula

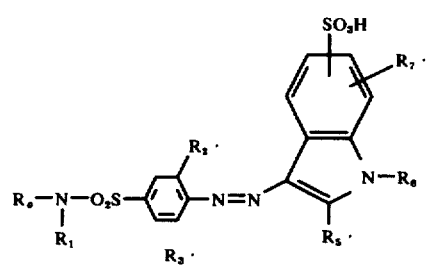

wherein $R_0$ denotes hydrogen; $C_1$–$C_6$-alkyl; $C_1$–$C_6$-alkyl substituted by hydroxy, chlorine, bromine, cyano, $C_1$–$C_4$-alkoxy or $C_1$–$C_4$-alkoxycarbonyl; cyclohexyl; phenyl; naphthyl; tolyl; benzyl; phenethyl; 3-sulfolanyl;

$R_1$ denotes hydrogen; $C_1$–$C_6$-alkyl; $C_1$–$C_6$-alkyl substituted by hydroxy, chlorine, bromine, cyano, $C_1$–$C_4$-alkoxy or $C_1$–$C_4$-alkoxycarbonyl; cyclohexyl or together with $R_0$ a piperidino, pyrrolidino or morpholino ring;

$R_2'$ denotes chlorine or bromine;
$R_3'$ denotes chlorine or bromine;
$R_5'$ denotes $C_1$–$C_4$-alkyl or phenyl;
$R_6$ denotes hydrogen; $C_1$–$C_4$-alkyl, $C_1$–$C_4$-alkyl substituted by cyano, carbonamide or carboxy; and $R_7'$ denotes hydrogen, chlorine or $C_1$–$C_4$-alkyl.

3. Monoazo dyestuff of claim 2 of the formula

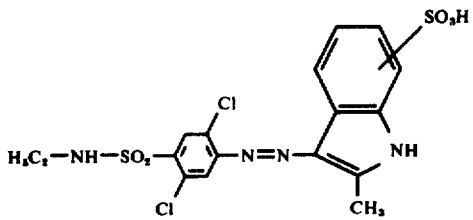

* * * * *